United States Patent [19]
Pages

[11] Patent Number: 5,774,818
[45] Date of Patent: Jun. 30, 1998

[54] METHOD FOR PILOTING AN AERODYNE BY AUTOMATIC CONTROL ONTO A HORIZONTAL PATH DETERMINED FROM WAY POINTS

[75] Inventor: Patrick Pages, Montrouge, France

[73] Assignee: Sextant Avionique, Velizy Villacoublay, France

[21] Appl. No.: 582,973

[22] Filed: Jan. 4, 1996

[30] Foreign Application Priority Data

Jan. 6, 1995 [FR] France ................................. 95 00555

[51] Int. Cl.⁶ .............................................. G06F 165/00
[52] U.S. Cl. .............................. 701/3; 701/206; 244/175
[58] Field of Search ..................... 364/424.012, 424.021, 364/445, 448; 73/178 R; 244/175, 76 R; 340/971, 979; 701/3, 11, 203, 206

[56] References Cited

U.S. PATENT DOCUMENTS

| | | | |
|---|---|---|---|
| 4,224,507 | 9/1980 | Gendreu | 235/412 |
| 4,692,869 | 9/1987 | King et al. | 364/448 |
| 4,999,782 | 3/1991 | Bevan | 364/448 |
| 5,448,486 | 9/1995 | Watland | 364/445 |
| 5,646,854 | 7/1997 | Bevan | 364/448 |

FOREIGN PATENT DOCUMENTS 0 315 654 A3   1/1990   European Pat. Off. .

OTHER PUBLICATIONS

E.I. Mueldorf, The Interssection of a Loxodrome With a Great Circle, IEEE Transactions on Aerospace and Electronic Systems, vol. 26, No. 2, pp. 410–412, Mar. 1990.
Patent Abstracts of Japan, vol. 00 No. 00, Dec. 22, 1994.

*Primary Examiner*—Gary Chin
*Attorney, Agent, or Firm*—Browdy & Neimark

[57] ABSTRACT

In order to pilot an aerodyne between two geographical positions associated with a transition route constraint, the method according to the invention comprises the application to each of these positions of a first transformation transforming the rhumb lines into straight lines, the construction of a path joining these positions while complying with the route constraints associated with these points, by means of arcs of circles and segments of straight lines tangential to the arcs of circles, the computation of the respective positions of the intermediate points spaced not far apart on said path, the application to said intermediate points of a transformation that is the reverse of said first transformation, so as to determine the geographical position of these intermediate points, and the automatic control of the piloting of the aerodyne so that its path flies over each of said intermediate points.

11 Claims, 1 Drawing Sheet

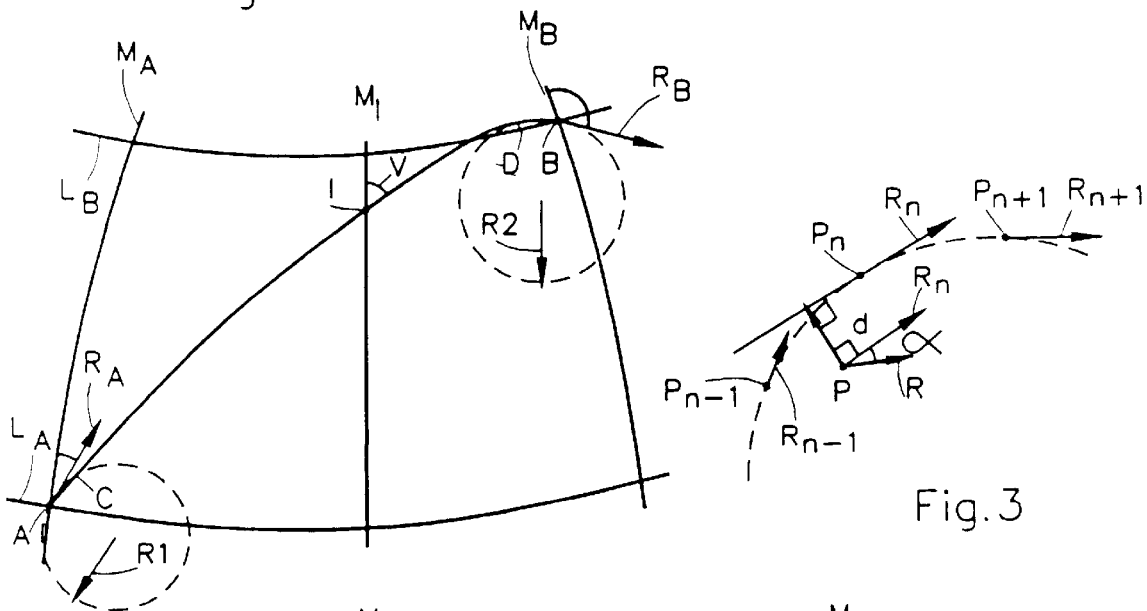
Fig. 1
Fig. 3
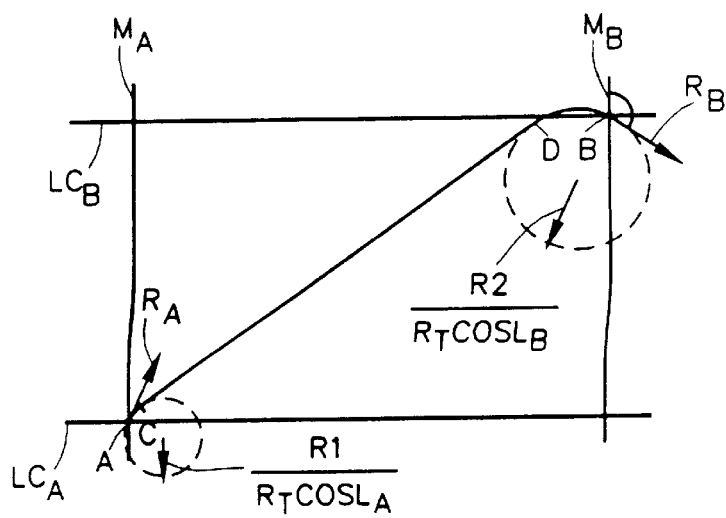
Fig. 2
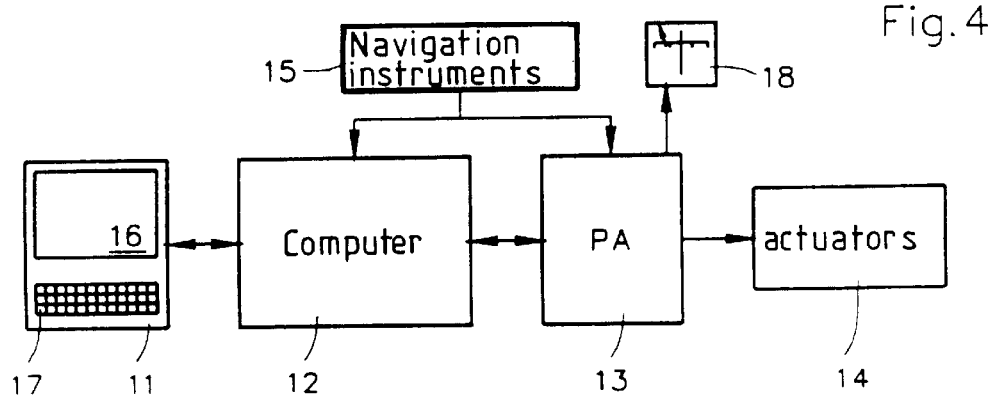
Fig. 4

METHOD FOR PILOTING AN AERODYNE BY AUTOMATIC CONTROL ONTO A HORIZONTAL PATH DETERMINED FROM WAY POINTS

BACKGROUND OF THE INVENTION

1. Field of the Invention

This invention relates to a method of piloting an aerodyne using the geographical coordinates of the departure and destination of the aerodyne, as well as the departure and destination routes.

It applies notably, though not exclusively, to automatic pilot computers installed on board aerodynes.

2. Description of the Prior Art

At the present, such a computer performs the automatic piloting of an aerodyne by periodically computing the commands to be applied to the control surfaces of the aerodyne as a function of the current position and route of the aerodyne and those of the destination. In fact, this computation consists in periodically determining the heading corrections to be performed in order to reach the destination position, and, at a certain distance from the destination position, in determining the commands to be applied to the control surfaces so as to have the aerodyne turn in order to enable it to rejoin its destination route.

A computer of this type does not provide any path beforehand, whence the impossibility for the pilot to have prior knowledge of the exact path the aerodyne will follow. In the context of certain aerodyne missions, the absence of a predetermined path has numerous drawbacks. Thus, for example, the pilot cannot use visual landmarks on the ground to check his position and whether he is ahead of or behind schedule. Moreover, flying at low altitude is dangerous in the absence of a predetermined path. Furthermore, in the event of a threatening area or localised weather disturbance occurring on the route taken, he will not know exactly whether the aerodyne will be crossing this area.

In addition, the path of an aerodyne can be broken down into straight line phases and constant radius turn phases. When the distances to be traveled are long, the paths followed by the aerodynes cannot be assimilated to simple forms due to the roundness of the Earth, so that a straight line phase characterized by constant heading flight actually describes a curve that can be assimilated to a rhumb line. Such a path can therefore only be worked out by sophisticated mathematical calculations, notably to determine the equations describing the rhumb lines tangential to circles. These calculations therefore require substantial data processing means, or can only be performed at a speed that is incompatible with the real-time context of aerodyne piloting.

OBJECT OF THE INVENTION

The main object of this invention is to remedy the preceding disadvantages.

SUMMARY OF THE INVENTION

Accordingly, there is provided a method for piloting an aerodyne between a departure position and a destination position, each of these two positions being defined by a latitude and a longitude and associated with a transition route constraint.

This method is characterized in that it comprises:
  the application to the departure and destination positions of a first transformation transforming the rhumb lines into straight lines,
  the construction of an initial path joining the departure and destination positions while complying with the route constraints associated with these points, by means of arcs of circles and segments of straight lines tangential to the arcs of circles,
  the computation of the respective positions of the intermediate points spaced not far apart on said path by means of the equations of the arcs of circles and straight line segments,
  the application to said intermediate points of a transformation that is the reverse of said first transformation, so as to determine the position of these intermediate points in terms of latitude and longitude, and
  the piloting of the aerodyne so that its path flies over each of said intermediate points.

By means of such a transformation, the aerodyne is placed in a reference system in which a path between two points can be defined simply with arcs of circles and segments of straight lines at a tangent to the arcs of circles. Such a path enables the pilot to know exactly where he will switch over to the automatic pilot phase.

Advantageously, said first transformation consists in converting the latitudes of the departure and destination positions into increasing latitudes by application of a first transformation formula stating the increasing latitude $L_c$ as a function of the latitude L:

$$L_C = \ln \left| tg \left( \frac{L}{2} + \frac{\pi}{4} \right) \right|$$

ln being the natural logarithm function, tg being the tangent function and L the latitude.

In this manner, a reference system of the Mercator map type is used in which the meridians and parallels are rectilinear and parallel, the meridians being spaced regularly apart and the parallels being perpendicular to the meridians. In this reference system, the rhumb lines are transformed into straight lines, and the circles remain circles by first approximation. Within this reference system, it is thus possible to determine with precision a path comprised of arcs of circles tangential to segments of straight lines, and, by means of the equations describing the latter, the respective positions of points spaced not far apart belonging to this path.

According to a feature of the invention, the path of an aerodyne between two points is defined by two arcs of circles passing through the departure and destination positions and a segment of a straight line tangential to both arcs of circles.

Advantageously, the method according to the invention comprises the computation, at each point of said set, of the route enabling the next point to be reached, the piloting of the aerodyne consisting in commanding the control surfaces of the aerodyne in order to reduce the variance between the actual course and that of the next point, and in reducing the variance between the position of the aerodyne and said path.

BRIEF DESCRIPTION OF THE DRAWINGS

Further features and advantages of the invention will be apparent from an embodiment of the invention described, by way of a non-limiting example, in reference to the corresponding accompanying drawings in which:

FIG. 1 schematically represents a path of an aerodyne between two geographical points;

FIG. 2 shows the same path as the one represented in FIG. 1, but expressed in increasing longitude and latitude;

FIG. 3 illustrates a method of automatically controlling the piloting of the aerodyne on a path determined by a set of points;

FIG. 4 schematically represents a device enabling implementation of the method according to the invention.

DESCRIPTION OF THE PREFERRED EMBODIMENTS

FIG. 1 represents a portion of the path of an aerodyne between a point A and a point B, these two points having to be flown over according to respective transition routes $R_A$, $R_B$. Point A is situated on the meridian $M_A$ and the parallel $L_A$, whereas point B is situated on the meridian $M_B$ and the parallel $L_B$.

To reach point B from point A while complying with the course restrictions $R_A$ and $R_B$, the aerodyne describes a path comprising a "rejoining turn" phase A–C describing an arc of a circle of constant radius projected on the ground, then a "straight line" phase C–D describing a path of constant heading (rhumb line) or of zero roll angle (orthodromy), and finally a "capture turn" phase D–B describing an arc of a circle of constant radius projected on the ground.

A rhumb line type "straight line" phase can be modelled by means of the following differential equation:

$$dM = tg\, V \times \frac{dL}{\cos L} \quad (1)$$

where dM is the longitude differential, dL is the latitude differential, L is the latitude of the rhumb line point under consideration and V is the rhumb line heading, i.e. the angle formed by any point on the rhumb line with a meridian $M_J$. If we posit:

$$dL_c = \frac{dL}{\cos L} \quad (2)$$

$L_c$ being referred to as the increasing latitude, we obtain the following after integration of the differential equation (1), since V is constant:

$$\Delta M = tg\, V \times \Delta L_c \quad (3)$$

with, after integration of the equation (2):

$$L_c = \ln \left| tg\left(\frac{L}{2} + \frac{\pi}{4}\right) \right| \quad (4)$$

It ensues from equation (3) that, in a Cartesian reference system ($L_c$, M), the image of a "straight line" phase is therefore a straight line.

As for the turn phases A–C and D–B, a circle of radius R has as equation in a metric reference system ($X_{east}$, $X_{north}$):

$$X^2_{east} + \Delta X^2_{north} = R^2 \quad (5)$$

To go from a reference system with coordinates in latitude and longitude (L, M) to a reference system with coordinates in increasing latitude and longitude ($L_c$, M), the following differential equations must be applied:

$$dX_{east} = R_T \times \cos L \times dM \quad (6)$$

$$dX_{north} = R_T \times \cos L \times dL_c \quad (7)$$

where $R_T$ is the radius of the earth.

However, the radii of turns are usually less than some ten kilometers. Far from the poles, the term cos L can therefore be deemed constant throughout the turn. The following approximations can therefore be made:

$$\Delta X_{east} = R_T \times \cos L \times \Delta M \quad (8)$$

$$\Delta X_{north} = R_T \times \cos L \times \Delta L_c \quad (9)$$

By replacing $\Delta X_{east}$ and $\Delta X_{north}$ given by the equations (8) and (9) in the equation of the circle (5), we obtain:

$$\Delta L_c^2 + M^2 = \left(\frac{R}{R_T \times \cos L}\right)^2 \quad (10)$$

In a Cartesian reference system ($L_c$, M), the image of a circle of radius R is therefore close to a circle of radius as follows:

$$\frac{R}{R_T \times \cos L} \quad (11)$$

In order to determine a path of an aerodyne between the points A and B, by application of the method according to the invention, all that needs be done is to convert the latitudes of points A and B into increasing latitudes by applying the equation (4).

A path must then be constructed as represented in FIG. 2, so as to join point A of coordinates ($L_{CA}$, $M_A$) to point B of coordinates ($L_{CB}$, $M_B$), beginning by defining two arcs of circles A–C and D–B respectively tangential at A and B to the directions $R_A$ and $R_B$. For each arc of a circle, the choice of circle (right or left) in relation to the direction $R_A$ or $R_B$ and its radius are determined by means of a known algorithm using notably the speed and altitude of the aerodyne, as well as the position of the next point to be reached in relation to the position of the previous point.

Finally, the two arcs of circles AC and DB need only be joined together by a segment of a straight line tangential at C and D to the two arcs of circles, the respective angles of the two arcs of circles being determined in such a way that the latter are tangential to the segment of straight line C–D.

The next stage of the method according to the invention consists in calculating a set of equidistant intermediate points, e.g. less than 500 meters apart, from the path A–C–D–B thus determined, and then in converting the respective increasing latitudes of these points into latitudes by applying the reverse formula of the equation (4), stating the latitude as a function of increasing latitude, i.e.

$$L = 2 \times \text{Arc } tg(e^{Lc}) - \frac{\pi}{2} \quad (12)$$

The route constraint is computed for each intermediate point of said set, this course being constant and equal to V on straight line portions.

The piloting of the aerodyne must then be automatically controlled for the path thus determined.

This automatic control operation can be performed either manually by the pilot, by means of the displaying of a tendency bar indicating to the pilot the course corrections to be made in order to rejoin and follow that path, or it can also be performed by the aerodyne's automatic piloting device which periodically determines and applies the corrective commands to the control surfaces of the aerodyne to make it follow a path tangential to the predetermined path, in order to reduce the variance between the latter and the position of the aerodyne.

To do so, the computer of the automatic piloting device, which also controls the displaying of the tendency bar, determines, among the set of intermediate points previously determined and defining the path to be followed by the aerodyne within a reference system expressed in latitude and longitude (L, M), the next point $P_n$ to be flown over, as a function of the position P of the aerodyne (FIG. 3).

It computes the lateral variance d between the position P of the aerodyne and the axis running through the point $P_n$ and oriented in accordance with the route constraint $R_n$ associated with the point $P_n$, and the angular variance α of the route between the heading R followed by the aerodyne and the route constraint $R_n$.

It then computes the instructions to be applied to the control surfaces with a view to canceling the lateral variance d and the angular route variance α, in order to describe a rejoining path comprising, if necessary, a rejoining turn, a segment of straight line and a capture turn.

In the case of the pilot switching to manual piloting, the computer periodically determines a rejoining path to rejoin the path initially defined, and at the time of switching to automatic piloting, the automatic controlling of the piloting of the aerodyne on the last rejoining path computed during manual piloting, and when the aerodyne has rejoined the previously defined path A–C–D–B, the automatic controlling of the piloting of the aerodyne on the latter.

The method according to the invention can be embodied by a device such as the one represented in FIG. 4.

This device comprises a man/processor communications terminal 11 including a control mechanism such as e.g. a keyboard 17, enabling the pilot to key in the data pertaining to the mission to be accomplished.

Such a mission notably comprises a flight plan defined by a set of geographical points each defined by a position (L, M) possibly associated with a route constraint R. These data are transmitted to a computer 12 which computes, in accordance with the method according to the invention, the paths to be followed respectively between each of the points entered by the pilot, in compliance with the route constraints associated with these points, each of these paths being defined by a set of points spaced not far apart in relation to the points entered by the pilot.

The computer 12 is linked up to the navigational instruments 15 taken on board the aerodyne, so as to receive the navigational data in real time, and notably the position P and heading R of the aerodyne, with a view to determining the next point $P_n$ to be reached on the predetermined path A–C–D–B, and to computing the rejoining paths for the manual piloting phase.

The computer 12 is also connected to the aerodyne's automatic piloting device 13 in order to provide it, at all times during the automatic piloting phase, with the position $(L_n, M_n)$ and route $R_n$ of the next point $P_n$ to be reached.

The automatic piloting device 13 is further connected to the navigational instruments 15 to compute the instructions to be applied to the control surfaces as a function of the position and course of the aerodyne, and to the control surface actuators 14 in order to carry out the instructions thus computed. It is also connected to a tendency bar display 18 which, during the manual piloting phase, indicates to the pilot the piloting commands to be performed to rejoin and follow a predetermined path.

The terminal 11 further comprises a viewing screen 16 enabling the pilot to view the path as it has been computed by the computer 12, as well as the position of the aerodyne at all times in relation to this path.

I claim:

1. A method for piloting an aerodyne between a first point and a second point, a position of each of said first and second points being defined by a latitude and a longitude and associated with a transition route constraint, said method comprising:

applying to said first and second points a loxodromic lines of constant heading into straight lines, constructing an initial path joining the respective transformed positions of said first and second points while complying with said transition route constraints associated with said first and second positions, by means of two arcs of circles respectively passing through said respective transformed positions of said first and second points and respectively tangential to said associated transition route constraints, and a segment of a straight line tangential to both of said two arcs of circles, computing respective transformed positions of intermediate points on said initial path by means of equations modeling said two arcs of circles and said straight line segment, applying to said intermediate points a reverse transformation of said first transformation, so as to determine respective positions of said intermediate points in terms of latitude and longitude, computing commands to be applied to control surfaces of the aerodyne so that the aerodyne flies over each of said intermediate points, and piloting the aerodyne in accordance to said computed commands.

2. The method as claimed in claim 1, wherein said first transformation consists in converting the latitudes of said first and second points into increasing latitudes by applying the following transformation formula stating the increasing latitude $L_c$ as a function of the latitude L:

$$L_c = \ln \left| \text{tg} \left( \frac{L}{2} + \frac{\pi}{4} \right) \right|$$

ln being the natural logarithm function, tg being the tangent function.

3. The method as claimed in claim 1, further comprising a step of indicating to an aerodyne pilot maneuvers to be performed in order to follow a path tangential to said initial path, in order to reduce variance between a current position of the aerodyne and said initial path.

4. The method as claimed in claim 1, further comprising a step of automatic piloting the aerodyne consisting in commanding control surfaces of the aerodyne so as to follow a path tangential to said initial path, in order to reduce variance between a current position of the aerodyne and said initial path.

5. The method as claimed in claim 1, further comprising computing at each of said intermediate points a route enabling a next intermediate point on said initial path to be reached by said aerodyne.

6. The method as claimed in claim 5, further comprising:

computing periodically a distance between the current position of the aerodyne and an axis running through a next intermediate point on said initial path to be flown over by the aerodyne, said axis being oriented parallel to a route associated with said next intermediate point, computing periodically a route variance between the current route of the aerodyne and the route associated with said next intermediate point, and piloting the aerodyne so as to reduce said distance and said route variance.

7. The method as claimed in claim 1, further comprising displaying on a viewing screen of a terminal said initial path, as well as real-time displaying of a current position of the aerodyne in relation to said initial path.

8. The method as claimed in claim 1, further comprising:

a manual piloting phase during which a path rejoining said initial path is periodically computed, said rejoining path being defined by intermediate points, and an automatic piloting phase during which the aerodyne is automatically piloted such that the aerodyne flies over each of said intermediate points on the rejoining path.

9. The method as claimed in claim 8, further comprising real-time displaying on a viewing screen of a terminal said last rejoining path determined, said initial path, and a current position of the aerodyne in relation to the paths displayed.

10. The method as claimed in claim 1, wherein said intermediate points are spaced less than 500 meters apart.

11. A method for piloting an aerodyne between a departure point and a destination point, comprising the steps of:
   (1) entering into a terminal a flight plan comprising a succession of respective way points, each of said way points being defined by a latitude and a longitude and associated with a respective route constraint,
   (2) determining a path between each pair of a first and a second successive way points of said way points, while complying with the route constraints associated with said way points, by:
      (a) applying to respective positions of said first and second way points a transformation transforming loxodromic lines of constant heading into straight lines,
      (b) constructing an initial path joining said first and second way points while complying with said transition route constraints associated with said way points, by means of two arcs of circles respectively passing through the respective transformed positions of said first and second way points and respectively tangential to said associated transition route constraints and a segment of a straight line tangential to both of said two arcs of circles,
      (c) computing respective transformed positions of intermediate points on said initial path by means of equations modeling said two arcs of circles and said straight line segment,
      (d) applying to the respective transformed positions of said intermediate points a reverse transformation of said transformation, so as to determine respective positions of said intermediate points in terms of latitude and longitude, and
   (3) computing commands to be applied to control surfaces of the aerodyne so that the aerodyne flies over each of said intermediate points,
   (4) piloting the aerodyne in accordance to said computed commands.

* * * * *